United States Patent
Timm

(10) Patent No.: US 12,012,526 B2
(45) Date of Patent: Jun. 18, 2024

(54) SHEET MATERIAL HAVING A SUSTAINABLE ADHESIVE COATING

(71) Applicant: Kufner Holding GMBH, Unterhaching (DE)

(72) Inventor: Christoph Timm, Leoben (AT)

(73) Assignee: Kufner Holding GMBH, Unterhaching (DE)

(*) Notice: Subject to any disclaimer, the term of this patent is extended or adjusted under 35 U.S.C. 154(b) by 707 days.

(21) Appl. No.: 17/271,951

(22) PCT Filed: Aug. 13, 2019

(86) PCT No.: PCT/EP2019/071695
§ 371 (c)(1),
(2) Date: Feb. 26, 2021

(87) PCT Pub. No.: WO2020/043480
PCT Pub. Date: Mar. 5, 2020

(65) Prior Publication Data
US 2021/0324246 A1 Oct. 21, 2021

(30) Foreign Application Priority Data

Aug. 31, 2018 (DE) ...................... 10 2018 214 839.2

(51) Int. Cl.
*C09J 101/10* (2006.01)
*A41D 27/06* (2006.01)
*C09D 101/10* (2006.01)

(52) U.S. Cl.
CPC ............ *C09J 101/10* (2013.01); *A41D 27/06* (2013.01); *C09D 101/10* (2013.01)

(58) Field of Classification Search
CPC .. A41B 1/14; A41B 3/06; A41D 27/06; C09D 101/10; C09J 101/10; D04H 1/62; D04H 1/66

See application file for complete search history.

(56) References Cited

U.S. PATENT DOCUMENTS

2007/0260014 A1  11/2007  Simon et al.

FOREIGN PATENT DOCUMENTS

| CN | 1863836 A | 11/2006 |
|---|---|---|
| CN | 101240087 A | 8/2008 |
| CN | 102186916 A | 9/2011 |
| CN | 103249792 A | 8/2013 |
| CN | 109844006 A | 6/2019 |
| DE | 199 58 526 A1 | 6/2000 |
| DE | 103 47 665 A1 | 5/2005 |
| DE | 10 2013 205 144 A1 | 9/2014 |
| DE | 10 2014 000 417 A1 | 7/2015 |
| GB | 460 751 A | 2/1937 |
| JP | H04-316682 A | 11/1992 |
| JP | 2001-303446 A | 10/2001 |
| JP | 2003-073644 A | 3/2003 |
| JP | 2007-508463 A | 4/2007 |
| WO | WO 2005/059238 A1 | 6/2005 |
| WO | WO 2018/038671 A1 | 3/2018 |

OTHER PUBLICATIONS

International Search Report and Written Opinion for International Application No. PCT/EP2019/071695, dated Nov. 11, 2019.
Chapter II International Preliminary Report on Patentability for International Application No. PCT/EP2019/071695, dated Mar. 4, 2021.
Office Action for Japanese Application No. 2021-536153, dated Apr. 25, 2023.

*Primary Examiner* — Arti Singh-Pandey
(74) *Attorney, Agent, or Firm* — Wolf, Greenfield & Sacks, P.C.

(57) ABSTRACT

The present invention discloses a heat-sealable textile sheet material having a substrate on the basis of a woven fabric, knitted fabric, optionally with weft insertion, or a nonwoven fabric and an adhesive coating applied thereto, which is characterized in that 70-100% by weight of the adhesive coating consists of renewable raw materials.

9 Claims, No Drawings

SHEET MATERIAL HAVING A SUSTAINABLE ADHESIVE COATING

RELATED APPLICATIONS

This Application is a national stage application filed under 35 U.S.C. § 371 of International Patent Application Serial No. PCT/EP2019/071695, filed Aug. 13, 2019, which claims the benefit of German Application Serial No. DE 10 2018 214 839.2, filed Aug. 31, 2018, each of which is herein incorporated by reference in its entirety.

The present invention relates to a heat-sealable textile sheet material having a substrate based on a woven fabric, knitted fabric, optionally with weft insertion, or a nonwoven fabric and an adhesive coating applied to the surface thereof, as well as to a method for its production.

BACKGROUND OF THE INVENTION

Interlinings, which are the invisible framework of a variety of garments, have been known for a long time, (see DE 10 2014 000417 A1) and are used, among other things, to reinforce the front part of garments or to reinforce collars and cuffs. These interlinings usually consist of a substrate, which may be in the form of woven, knitted or even nonwoven fabric, and of an adhesive composition, usually thermoplastic, applied thereto, usually in grid form, wherein this adhesive composition provides a favorable bond with the face fabric of the garments when heat and pressure are applied. Common grids use 1-200 dots/cm$^2$, preferably 20-150 dots/cm$^2$.

Such interlinings are designed to shape and stabilize the garment. Since they are bonded to the face fabric, they have a decisive influence on the character of the finished garment. The appearance, dimensional stability, softness, wearing comfort as well as the care properties during cleaning, washing, ironing and drying depend decisively on the type and structure of the interlining used as is known from DE 10 2007 006568 A1.

Particularly important properties of the garments here are the look, feel and care behavior of the finished garment.

In addition to clothing, such interlinings are also used as technical textiles, e.g. in the furniture and upholstery as well as the automotive and aviation industries.

Usually, the adhesive composition is applied in the form of a double dot consisting of a lower and upper dot as described in DE 22 14 236 and DE 22 31 723. In this case, the viscous-pasty lower dot is printed onto the substrate material, e.g. by means of stencil screen printing or engraving roller, and the upper dot is scattered on in the form of powdered hotmelt adhesive. According to DE 22 31 723, the upper and lower dots differ in their respective thermoplastic flow. The lower dot has the function, on the one hand, of creating the bond between the substrate material and the upper dot and, on the other hand, of preventing the upper dot from flowing through to the back of the substrate material during fixing, so-called bleed-through/back riveting. The upper dot decisively determines the adhesion properties and ensures the bond between the interlining and the face fabric. The structure of the respective adhesive compositions for the upper and lower dots has a significant influence on the properties of the interlinings and the composite of the interlining and the face fabric. In particular, the adhesion of the interlining to the face fabric, the wash resistance and the textile feel of the composite are determined by a suitable choice of material.

Both lower and upper dots are usually composed of thermoplastics such as polyethylene, polyurethane, polyacrylate, copolyester and/or copolyamide.

Various requirements are placed on the composition of the lower dot with regard to producibility. The paste must be conveyable with the usual pump systems and be printable as cleanly and residue-free as possible. This means that it must flow cleanly through or out of the printing form onto the substrate, and no deposits should form on the printing form, as this would lead to an unclean print image or dot grid. For this purpose, it is advantageous if the paste has the lowest possible viscosity and solids content.

The paste should have good stability after the printing process, i.e. it should not be absorbed too strongly into the substrate and should ideally form a hemispherical printing dot. For this purpose, it is advantageous if the paste has a higher viscosity and a thixotropic viscosity profile.

After scattering on the upper dot, the coated substrate material is run through a drying tunnel to remove the solvent components of the lower dot and to bond the upper and lower dots together and to the substrate, so-called sintering. Here, it is advantageous in terms of energy consumption if the paste has as high a solids content as possible. The composite should also be characterized by a soft textile feel.

A lower dot corresponding to this property profile is usually composed of one or more thermoplastics, such as polyethylene, polyurethane, polyacrylate, polyvinyl chloride, polyvinyl acetate, copolyester and/or copolyamide polymers, flow aids, such as (poly)ethylene glycol, (poly) propylene glycol, glycerol, organic or mineral thickeners such as polyacrylates, polyurethanes, methyl cellulose, ethyl cellulose, bentonite, silicic acid, water and, optionally, conventional auxiliaries such as optical brighteners and crosslinkers.

The materials used here are largely manufactured starting from fossil raw materials. In the course of the increasing demand for sustainable products and/or products manufactured from renewable raw materials, polyamides, polyethylene, polyesters and polyurethanes manufactured entirely or partly from renewable raw materials are now commercially available, e.g. under the brand names Dynacoll Terra (Evonik), Platamid Rnew (Arkema), Impranil Eco (Covestro). The bio-based raw materials used here are identical to the fossil raw materials normally used (drop in, corresponds to nature-identical). These are, for example, carboxylic acids obtained from castor oil, which are used instead of petroleum-derived carboxylic acids in monomer synthesis for polyamide polymerization (e.g. Vestamid terra (Evonik), Paltamid Rnew (Arkema)).

Furthermore, ethanol and succinic acid are produced from carbohydrates, which serve as starting materials for the production of polyethylene, polyethylene glycol and other polyalcohols that can be used in the production of polyurethanes (e.g. Impranil Eco (Covestro)).

By using these products in the usual adhesive compositions for interlinings, contents of only up to about 50% can be achieved in the adhesive composition. The disadvantage here is on the one hand the still limited availability of products with the necessary properties, e.g. melting point and viscosity of a common scattering powder, and on the other hand the generally significantly higher price of a product made from renewable raw materials compared with a conventionally produced product made from fossil raw materials. Therefore, the use of these products for low-cost mass-produced articles such as interlinings for clothing has not been able to establish itself.

One object of the present invention is to provide an interlining whose adhesive composition is produced from the highest possible proportion of renewable raw materials without such interlining materials leading to significantly higher costs. At the same time, the desired properties such as sufficient adhesion of the interlining with the face fabric, wash and cleaning resistance, textile feel and low bleed-through or back riveting of the adhesive coating are to be maintained.

Surprisingly, it was found that a low-cost adhesive composition can be used which is produced to a high proportion from renewable raw materials and meets the above requirements. According to the invention, therefore, an adhesive composition is disclosed which consists of at least 70%, and preferably entirely, renewable raw materials. This composition is applied to a substrate based on a woven fabric, knitted fabric, optionally with weft insertion, or a nonwoven fabric, preferably in dot or grid form, while obtaining a heat-sealable sheet material.

In combination with the textile sheet material and the corresponding finishing chemicals from renewable raw materials, the result is a heat-sealable textile sheet material composed of 90-100% renewable raw materials, which can be used in particular as an interlining for clothing.

The adhesive composition of the present invention may be applied to the substrate as a single dot or in the form of a double dot, preferably in grid form, by a conventional process. Application as a double dot is preferred. In that case, the lower dot consists of the adhesive composition according to the invention and the upper dot can be created from conventional materials such as polyamide (e.g. Platamid®) or even polylactic acid powder. However, all conventional powder materials can be used that are scatterable and can be scattered onto the lower dot.

When combining the adhesive composition as a lower dot with a commercially available adhesive powder made proportionally from renewable raw materials as an upper dot (e.g. Platamid 2667 (Arkema)—60% renewable raw materials), all the desired properties of the adhesive coating can be achieved with a proportion of renewable raw materials of at least 70%, preferably at least 80%.

The adhesive composition preferably contains a combination of a bio-based polyelectrolyte complex composition, carbohydrates such as an optionally modified starch, and may additionally contain a vegetable flow aid. In addition to the above ingredients, other components such as thickeners, crosslinkers, plasticizers, flow aids and/or optical brighteners may be used.

Polyelectrolyte complexes are association complexes of oppositely charged particles. These can be, for example, polymers with different charges (polyanions and polycations), which form complexes due to electrostatic interaction.

The polyelectrolyte complex composition preferably contains cationic and anionic biopolymers such as e.g. fully or partially deacetylated chitosan, alkali lignin, polysaccharides such as alginic acid, pectin, gum arabic and carboxymethyl cellulose, or starch and cellulose. Other ingredients may include tartaric acid, succinic acid, citric acid or other bioavailable acids and water. The pH value is in the range of 1 to 6, preferably 1.5 to 5, more preferably in the range of 1.8 to 4.

Such compositions are known, for example, from WO 2018/038671, the contents of which are introduced herein by reference. Although this publication deals with the use of the biodegradable composition as a binder for fiber materials, it was not apparent to use this composition also as a material for the adhesive dot and in particular for the lower dot in a double dot coating. This is because, as explained, such adhesive coatings must form a good bond with the substrate after application to it and also have good properties in terms of washing behavior and, in particular, feel. It is not possible to use a composition known, for example, from WO 2018/038671. When printing the formulation, the composition would sink strongly into the fabric and the printing stencil would be covered with dried-on paste after a short time, which would prevent clean printing. Another disadvantage is the low solids content of the composition and the hard feel of the resulting interlining.

The composition is therefore modified to obtain the desired properties. For example, the dynamic viscosity is adjusted to a range of preferably from 8 to 30 Pas, particularly preferably from 8 to 20 Pas and especially from 10 to 15 Pas, wherein the viscosity is measured by means of a rotational viscometer (e.g. Haake VT2 plus). This is preferably carried out by using mineral or organic thickeners such as bentonites, fumed or precipitated silica, starch or cellulose derivatives. It has been shown that the composition according to the invention results in good adhesion and good wash resistance.

Surprisingly, it has been recognized that in combination with carbohydrates such as a chemically modified starch and a vegetable flow aid, the above disadvantages can be eliminated. The lower dot composition is readily conveyable, coats well, and the resulting interlining shows no back riveting. Although the starch derivative is water soluble, the corresponding adhesive composition has sufficient wash resistance. To further improve the wash resistance, the addition of suitable crosslinkers is possible.

Starch for use according to the present invention can be obtained from various crops, with the proportions of the starch types amylose and amylopectin varying depending on the species and variety. Preferred starch plants are those with the highest possible amylopectin content. The most important starch-producing plants are potatoes, corn and wheat.

Starch can be modified by means of physical, enzymatic or chemical processes, wherein properties such as solubility, swelling capacity, dispersibility, extrudability and film formation are influenced by structural changes. However, the properties of modified starch products depend not only on the type of modification, but also on the raw material itself.

Etherification and esterification reactions, which take place at the free OH groups of the starch molecules, are the preferred methods for the chemical modification of starch. Etherification is carried out by three basic methods: Williamson ether synthesis with alkyl halides, Michael addition of activated olefins, or reaction with epoxides. All reactions are usually base-catalyzed.

The esterification of starch can be carried out with organic or inorganic acids or their derivatives, with or without the addition of amines or amides as an activating reagent. Of particular importance as organic esters are the starch acetates, which are prepared from acetic anhydride or by transesterification of vinyl acetate. As inorganic starch esters, derivatives of the mineral acids of sulfuric acid, nitric acid and phosphoric acid are of particular interest.

In the adhesive composition according to the invention, a chemically modified corn starch, such as etherified or esterified starches by using organic or inorganic acids, such as phosphoric acids, especially preferably an inorganic ester derivative of corn starch and very particularly a monophosphate ester of corn starch, proves to be a suitable component to achieve the desired properties.

Preferably, flow aids are used in the adhesive composition. These flow aids fulfill several functions as a component of a coating paste: Keeping the coating moist by retaining water prevents the paste from drying on the stencil, lubricating the stencil surface: the flow aid forms a film on the stencil surface which prevents the build-up of paste residues and at the same time can act as a lubricant for the doctor blade, or influencing the rheological behavior of the pastes—enhancing the thixotropic behavior, which ensures good conveyability of the paste, good printability as well as less sinking of the coating dot into the substrate.

In the common aqueous paste compositions, hygroscopic compounds such as (poly)glycols are usually used as flow aids. Glycerol, (poly)ethylene glycol, (poly)propylene glycol, for example, are mentioned here.

Preferably, the adhesive composition of the present invention contains at most about 50% by weight, preferably at most about 45% by weight of the polyelectrolyte complex, 10-30% by weight, preferably 15-25% by weight, more preferably 25% by weight of the flow aid, and 15-20% by weight, preferably 15-18% by weight, more preferably 16% by weight of the modified starch, and may contain water and optionally brighteners.

The adhesive composition of the present invention can be used on cellulosic textiles as well as on all other common fiber types, such as polyester or polyamide, so that the petroleum-based plastic polymer pastes commonly used in the lower dot can be replaced by a product with a high proportion of renewable raw materials.

The heat-sealable sheet material of the present invention can be used for various textile applications, such as clothing, especially outerwear, for reinforcing collars and cuffs, but also in the automotive and aviation industries, or in furniture or upholstery, where such sheet materials are used. The sheet materials according to the invention are characterized by good adhesion values to the textile material, which do not deteriorate even after repeated washing.

Common adhesion values in men's outerwear (heavier textiles—e.g. 185 $g/m^2$; 97/3 wool/elastane fabric) are greater than 10 N/5 cm or ideally >15 N/5. In women's outerwear (lighter textiles e.g. 95 $g/m^2$, 100% cotton fabric), adhesion values are ideally greater than 10 N/5 cm.

These adhesion values are also achieved when using the claimed adhesive composition; at the same time, a good feel is achieved and the processability of the composition does not lead to problems such as clogging of the printing stencil. Likewise, no bleed-through or sinking of the adhesive composition applied to the substrate into the substrate material is observed.

The present invention is further illustrated by the following examples.

The corresponding parameters given in the examples were determined as follows.

Measurement of Adhesion:

For each adhesion to be measured, four 20×5 cm strips of the interlining fabric are cut. These four strips are laminated onto 25×7 cm strips of a test face fabric using the fixing conditions specified in each case (temperature, time/speed, pressure) in such a way that the upper 2 cm do not adhere to the face fabric and the test strip can be pulled off the face fabric at this point. After the laminate has cooled to room temperature, the face fabric is attached to a spring balance and the test strip is pulled off vertically. The average value of the four measurements is given as the adhesion.

Measurement of Back Riveting:

Four 20×5 cm strips of the interlining fabric are cut for each back riveting to be measured. In each case, one test strip is placed on the face fabric with the coated side facing down. Two interlining/face fabric combinations are placed on top of each other so that the coated sides of the interlining fabrics lie on top of each other. These four strips (face fabric-interlining-interlining-face fabric) are fixed together under the specified conditions. The separating force of the two interlining-face fabric composites or the adhesion of the two interlining backs to each other is determined by means of a spring balance in a similar way to the adhesion test and results in the value for the back riveting.

Determination of Wash Resistance or Adhesion after Washing:

Four 20×5 cm test strips each are fixed to a face fabric as described above. The adhesion before washing is determined. The test strips are washed at the specified temperature in a standard household washing machine and then dried at room temperature. Depending on the requirements, the washing is carried out several times. After the last wash and drying, the adhesion is measured. The average value of the four measurements after the respective number of washes is given as the wash resistance or adhesion after washing. The change in adhesion compared with the initial adhesion is taken as the measure of wash resistance.

Determination of the Aging Resistance:

Unfixed/Dry:

Six 20×5 cm test strips of the interlining are cut per measurement. Four test strips are stored for 4 weeks at 60° C. in a heating cabinet. The remaining two test strips are fixed to the test face fabric at the start of the storage period and the initial adhesion is determined. At the end of the 4 weeks storage period, the test strips are fixed on the face fabric and the adhesion is determined as described above. The change in adhesion compared to the initial adhesion is taken as the measure of aging resistance.

Unfixed/Wet:

Six 20×5 cm test strips of the interlining are cut per measurement. Four test strips are stored for 4 weeks over a water bath at 60° C. in an exicator. The remaining two test strips are fixed to the test face fabric at the start of the storage period and the initial adhesion is determined. At the end of the 4 weeks storage, the test strips are dried at room temperature, fixed on face fabric and the adhesion is determined as described above. The change in adhesion compared to the initial adhesion is taken as the measure of aging resistance.

Fixed Dry or Wet:

Six 20×5 cm test strips of the interlining are cut per measurement and laminated to the respective test face fabric under the specified fixing conditions. The adhesion of two samples is determined immediately after cooling. The remaining four samples are stored wet or dry for 4 weeks as described above and the adhesion is determined after completion of the storage period. The change in adhesion compared to the initial adhesion is taken as the measure of aging resistance.

EXAMPLE 1

The following adhesive composition was prepared.
Composition of a Lower Dot for a Grid Coating:

| | |
|---|---|
| Polyelectrolyte complex composition (OC-Biobinder™ OAK-Organoclick-100% renewable raw materials: Chitosan, carboxymethyl cellulose, citric acid, water). | 46.88 wt %. |

| | |
|---|---|
| Modified starch (modification with monophosphate) (Aric 4574-Agrana->95% renewable raw materials) | 15.62 wt. % |
| Propylene glycol vegetable (Radianol 4710-Oleon-100% renewable raw materials) | 25.00 wt. % |
| Water | 12.50% |

Dynamic viscosity: 13 Pas
Composition for the Upper Dot as a Scattering Powder:
Copolyamide (80-200 μm) (Platamid 2667—Arkema—proportion of renewable raw materials 60 wt. %)
Lower/upper dot ratio: 5/5 (weight)
Proportion of renewable raw materials in the total adhesive composition: 80%.

This adhesive composition is applied to a cotton fabric with a basis weight of 58 g/m². The paste dot is applied by stencil screen printing (Cp52/0.5, Cp52=52 arbitrarily/randomly arranged (computer) dots/100 mm² 0.5=diameter of the dots in mm). The copolyamide powder is scattered onto the still wet paste dot in the conventional way, the excess is sucked off and the sheet material is then dried at 180° C.
Adhesion Values
Application weight: 18 g/m²—Fusing temperature: 155° C., 15 s, 20 N/cm² (Kannegiesser CV 1000 CF belt fusing press)
Adhesion to 100% cotton test fabric: 11 N/5 cm
Adhesion to 97/3 wool/elastane test fabric: 11 N/5 cm
Back riveting 0 N/5 cm
Wash Resistance/Adhesion after Washing:
Application weight: 18 g/m²—Fusing temperature: 155° C., 15 s, 20 N/cm² (Kannegiesser CV 1000 CF belt fusing press)

| | |
|---|---|
| Adhesion to 100% cotton test fabric (women's outerwear; 95 g/m²) after 3x washing at 30° C. | 10 N/5 cm |
| Adhesion to 97/3 wool/elastane test fabric (men's outerwear; 185 g/m²) after 3x washing at 30° C. | 9 N/5 cm |
| Adhesion to 100% cotton test fabric test fabric after 3x washing at 60° C. | 9 N/5 cm |

Aging Resistance:
Application weight: 18 g/m²—Fusing temperature: 155° C., 15 s, 20 N/cm² (Kannegiesser CV 1000 CF belt fusing press)
Sample fixed on 100% cotton test fabric
  0 weeks: 11 N/5 cm
  4 weeks 60° C./dry: 11 N/5 cm
  4 weeks 60° C./humid: 10 N/5 cm
Sample fixed on 97/3 wool/elastane test fabric
  0 weeks: 11 N/5 cm
  4 weeks 60° C./dry: 10 N/5 cm
  4 weeks 60° C./humid: 9 N/5 cm
Sample unfixed after 4 weeks 60° C./dry
  Adhesion to 100% cotton test fabric 10 N/5 cm
  Adhesion to 97/3 wool/elastane test fabric 10 N/5 cm
Sample unfixed after 4 weeks 60° C./humid
  Adhesion to 100% cotton test fabric 10 N/5 cm
  Adhesion to 97/3 wool/elastane test fabric 9 N/5 cm

COMPARISON EXAMPLE 1

Composition Paste Dot:

| | |
|---|---|
| Polyelectrolyte complex composition (OC-Biobinder™ OAK-Organoclick-100% renewable raw materials) | 96.00 wt. % |
| Silica gel as thickener (HDK N 20-Wacker) | 4.00 wt. % |

Dynamic viscosity: 15 Pas
Upper Dot (Scattering Powder):
Copolyamide (80-200 μm) (Platamid 2667—Arkema—proportion of renewable raw materials 60 wt. %)
Lower/upper dot ratio: 5/5 (weight)
Proportion of renewable raw materials of the adhesive composition: 80 wt. %.

This adhesive composition is applied to a cotton fabric with a basis weight of 58 g/m². The paste dot is applied by stencil screen printing (Cp52/0.5). The copolyamide powder is scattered onto the still wet paste dot, the excess is sucked off, and the sheet material is then dried at 180° C.
Application weight: 15 g/m²—Fusing temperature: 155° C., 15 s, 20 N/cm² (Kannegiesser CV 1000 CF belt fusing press)
Adhesion to 100% cotton test fabric (as in example 1): 10 N/5 cm
Adhesion to 97/3 wool/elastane test fabric (as in example 1) 11 N/5 cm
Wash Resistance:

| | |
|---|---|
| Adhesion to 100% cotton test fabric after 3x washing at 60° C. | 8 N/5 cm |
| Adhesion to 97/3 wool/elastane test fabric after 3x washing at 60° C. | 9 N/5 cm |

The sheet material according to comparison example 1 has a hard, stiff feel, and a bleed-through or sinking of the dot into the cotton fabric was also observed. Particularly disadvantageous is the rapid drying of the composition on the stencil, which leads to defects in the coating pattern and an irregular application. This shows that the composition leads to poor results because it does not contain modified starch and also no flow aid.

EXAMPLE 2

Coating of 25 g/m² PES nonwoven fabric with paste dot composition from example 1 and a conventional copolyamide powder (Mp. 118-128° C.—Schaettifix 5130)
Adhesion:
Application weight: 10 g/m²—Fusing temperature: 127° C., 15 s, 20 N/cm² (Kannegiesser CV 1000 CF belt fusing press)
Adhesion to 100% cotton test fabric (as in example 1): 5 N/5 cm—nonwoven fabric tears
Adhesion to 97/3 wool/elastane test fabric: 5 N/5 cm—nonwoven fabric tears
Wash Resistance:
Adhesion to 100% cotton test fabric after 3×40° C. Wash: 5 N/5 cm—nonwoven fabric tears
Adhesion to 97/3 wool/elastane test fabric after 3×40° C. Wash: 5 N/5 cm—nonwoven fabric tears
This example shows that the adhesion of the paste dot to the cotton test fabric is higher than the interlining or the coated PES nonwoven fabric itself.

EXAMPLE 3

Coating of 50 g/m² organic cotton nonwoven fabric with paste dot composition of example 1 and copolyamide powder (80-200 μm) (Platamid 2667—Arkema—proportion of renewable raw materials 60 wt. %)

Application weight: 13 g/m²—Lower/upper dot ratio: 4/6 (weight)—Fusing temperature: 150° C., 15 s, 20 N/cm² (Kannegiesser CV 1000 CF belt fusing press)

Proportion of renewable raw materials in the total adhesive composition: 75 wt. %.

Adhesion to 100% cotton test fabric (as in example 1): 15 N/5 cm—nonwoven fabric tears Adhesion to 97/3% wool/elastane test fabric (as in example 1): 12 N/5 cm—nonwoven fabric tears Wash Resistance:

Adhesion to 100% cotton test fabric (as in example 1) after 3×40° C. wash: 11 N/5 cm—nonwoven fabric tears Adhesion to 97/3% wool/elastane test fabric after 3×40° C. wash: 12 N/5 cm—nonwoven fabric tears This example also shows that the adhesive composition has a high adhesion to the nonwoven fabric, which is maintained until the nonwoven fabric tears.

The invention claimed is:

1. A heat-sealable textile sheet material having a substrate formed as one of a woven fabric, knitted fabric, and a nonwoven fabric, and an adhesive coating applied thereto, wherein the adhesive coating is applied in the form of an upper and lower dots, 70-100 wt.% of the adhesive coating consists of renewable raw materials, wherein the lower dot is made of an the adhesive composition of up to 100% renewable raw materials having a bio-based polyelectrolyte complex composition combined with carbohydrates.

2. The heat-sealable textile sheet material according to claim 1, wherein the adhesive composition has a dynamic viscosity of 8-30 Pas, as measured with a rotational viscometer.

3. The heat-sealable textile sheet material according to claim 1 wherein the bio-based polyelectrolyte complex composition contains chitosan, carboxymethyl cellulose and an organic acid.

4. The heat-sealable textile sheet material according to claim 1, wherein the adhesive composition contains at most about 50 wt. % of the polyelectrolyte complex, 10-30 wt. % of the flow aid and 15-20 wt. % of modified starch.

5. The heat-sealable textile sheet material according to claim 4, wherein the adhesive composition further contains at least one of water and brighteners.

6. The heat-sealable textile sheet material according to claim 1, in combination with one of apparel and technical textiles.

7. The heat-sealable textile sheet material according to claim 6, wherein the technical textile is included in at least one of furniture and upholstery.

8. The heat-sealable textile sheet material according to claim 1, wherein the renewable raw materials are further combined with at least one of thickeners, crosslinkers, flow aids and optical brighteners.

9. The heat-sealable textile sheet material according to claim 8, wherein the thickeners are selected from mineral and organic thickeners.

* * * * *